United States Patent
Kotzin (10) Patent No.: US 6,791,968 B2
(45) Date of Patent: Sep. 14, 2004

(54) METHOD AND APPARATUS FOR WIRELESSLY COMMUNICATING DIFFERENT INFORMATION STREAMS

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 129 days.

(21) Appl. No.: 10/279,651

(22) Filed: Oct. 24, 2002

(65) Prior Publication Data

US 2004/0081134 A1 Apr. 29, 2004

(51) Int. Cl.$^7$ ................................................ H04B 7/212
(52) U.S. Cl. ........................ 370/348; 370/329; 370/431; 370/341; 370/395.21; 455/452.1; 455/452.2; 455/450; 455/509
(58) Field of Search ................................ 370/329, 348, 370/395.21, 431, 442, 443, 441, 444, 351, 352, 341, 342, 337, 344, 347, 468, 437; 455/450, 452.1, 452.2, 453, 455, 516, 509; 709/227, 228, 229

(56) References Cited

U.S. PATENT DOCUMENTS

| 5,282,204 A | | 1/1994 | Shpancer et al. |
|---|---|---|---|
| 5,946,633 A | | 8/1999 | McAlinden |
| 6,252,862 B1 | * | 6/2001 | Sauer et al. ................. 370/331 |
| 6,353,605 B1 | * | 3/2002 | Rautanen et al. ........... 370/337 |
| 6,374,112 B1 | * | 4/2002 | Widegren et al. ......... 455/452.2 |
| 6,526,281 B1 | * | 2/2003 | Gorsuch et al. ......... 455/452.1 |
| 2002/0133589 A1 | * | 9/2002 | Gubbi et al. ................. 709/225 |
| 2003/0054829 A1 | * | 3/2003 | Moisio ....................... 455/452 |

FOREIGN PATENT DOCUMENTS

| JP | 19990730/11-205848 | 7/1999 |
|---|---|---|
| WO | WO 97/48191 | 12/1997 |

* cited by examiner

Primary Examiner—Wellington Chin
Assistant Examiner—Chuong Ho
(74) Attorney, Agent, or Firm—Vedder, Price, Kaufman & Kammholz, P.C.

(57) ABSTRACT

A method and apparatus dynamically assigns each of a plurality of different information streams associated with one wireless communication unit (12a), to independent communication resources from different communication resource pools from each of a plurality of different wireless network elements (14a–14n), based on, for example, quality of service requirement data determined for each of the information streams. As such, the wireless communication unit (12a) may establish two or more separate links using two or more completely independent radio resources from different wireless base stations in the same system.

21 Claims, 4 Drawing Sheets

METHOD AND APPARATUS FOR WIRELESSLY COMMUNICATING DIFFERENT INFORMATION STREAMS

BACKGROUND OF THE INVENTION

The invention relates generally to wireless communication systems and methods and more particularly to wireless communication apparatus and methods that communicate a plurality of different information streams from a single wireless communication device. Mobile radio system performance and capability is highly dependent on numerous factors. For example, the instantaneous subscriber data rate and the location of a subscriber plays a crucial role to determine the efficiency and availability of communication resources for others subscribers. In addition, these factors vary widely over time, particularly in mixed voice and data systems with subscribers coming and going and being widely dispersed about the system. Also, quality criteria requirements of data that a subscriber wishes to send may vary significantly.

For example, wireless communication systems exist that allow a subscriber to communicate different streams of information through two different wireless systems at the same time. For example, a commercial device may use a dual transfer mode wherein one stream of information, such as data, is communicated via a satellite communication system via a satellite channel, and may communicate voice via a wireless cellular channel on a different system. However, such configurations require the use of differing channels or wireless communication resources from different systems.

Alternatively, wireless communication systems are known wherein a wireless communication unit, such as a subscriber, is assigned to separate communication resources such as two CDMA codes such as one for voice, and another for data, for communication to a same wireless network element, such as a base station. Alternatively, communication of both streams may be accomplished on a single radio source by prior multiplexing together of the independent information streams. When the subscriber moves within the system, both channels are reassigned together to another wireless network element during a hand off procedure. As such, conventional wireless communication systems effectively link a subscriber and its associated information streams to a common wireless network element. As a result, wireless communication resources, such as frequencies, time slots or CDMA codes for one subscriber are assigned to the same wireless network element and are typically handed off to another wireless network element as the subscriber moves throughout the system. A problem can arise where a subscriber wishes to communicate one information stream at a high data rate and high quality of service level, in addition to a voice communication. If the wireless network element does not have enough capacity, the subscriber is denied the ability to communicate one or both of the different information streams.

Accordingly a need exists for a wireless communication system and method that overcomes one or more of the above problems.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF A PREFERRED EMBODIMENT OF THE INVENTION

Briefly, a method and apparatus dynamically assigns each of a plurality of different information streams associated with one wireless communication unit, to independent communication resources from different communication resource pool locations from each of a plurality of different wireless network elements, such as base stations, based on, for example, quality of service requirement criteria determined for each of the information streams. As such, a wireless communication unit, such as a subscriber, or other suitable unit, may establish two or more separate links using two or more completely independent radio resources from different base stations in the same system. During hand offs, individual information streams may be handed off to different base stations for a single subscriber. Hence one information stream that may require high speed internet packet communication may be assigned to one base station, and another communication resource for another base station may be used for the same subscriber to communicate speech information. Furthermore, the mode of operation for each of the individual active radio resources can be beneficially and optimally selected and controlled within the wireless network control element, for example power control, handoff, protocol, etc.

In one embodiment, a wireless network control element, such as a base station controller (BSC), or any other suitable control element, is operatively coupled to a wireless network element (e.g. a transceiver) to receive a request from the wireless communication unit, for a communication resource allocation for each of a plurality of information streams. A control circuit, operatively coupled to the transceiver, dynamically assigns each of the plurality of information streams to each of a plurality of different wireless network elements. The control circuit, such as a suitable processing device, evaluates communication network loading including operation of each of the plurality of wireless network elements and a plurality of wireless communication units in a system, or subsystem, to take into account system-wide dynamics to provide an optimized assignment for a single subscriber to different communication resources associated with different wireless network elements. The wireless network elements assigned to accommodate the single subscriber's multiple streams are not necessarily collocated.

Figure 1:
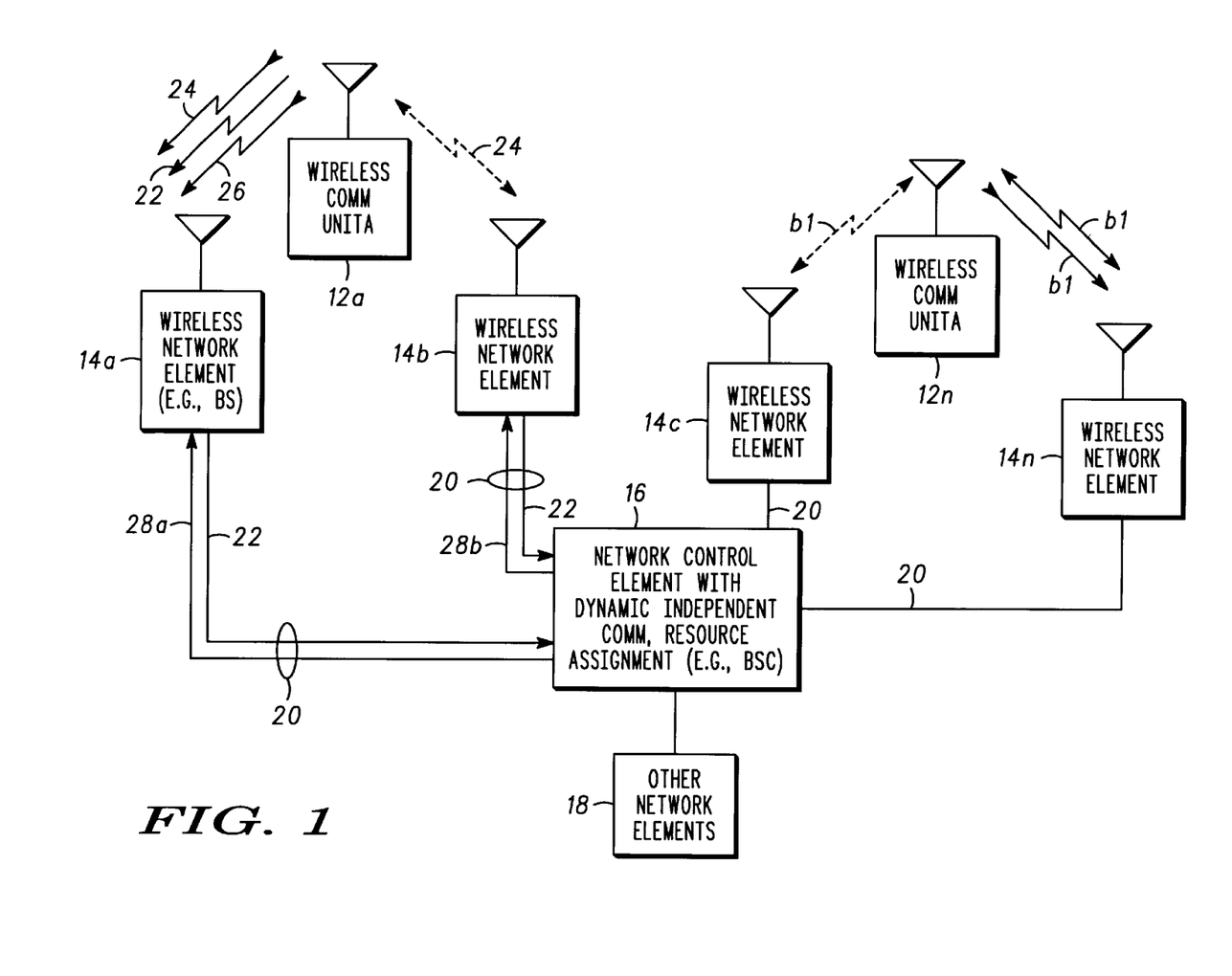
FIG. 1 is a block diagram illustrating one example of a wireless communication system in accordance with one embodiment of the present invention.

FIG. 1 illustrates one example of a wireless communication system 10, such as a CDMA communication system or any other suitable wireless communication system. The wireless communication system 10 includes one or more wireless communication units 12a–12n, a plurality of wireless network elements 14a–14n, and a network control element 16 with dynamic independent communication resource assignment 15. The network control element with dynamic independent communication resource assignment 16, may be coupled to any other suitable network elements, non-network elements or other networks including the internet, public switching telephone network, mobile switching centers, or any other suitable entities, generally designated 18 as desired. For purposes of illustration only, and not limitation, the invention will be described with reference to a CDMA wireless communication system, however, it will be recognized that any suitable TDMA, FDMA or any suitable combination thereof or any other suitable wireless communication system may also be employed. The wireless communication units 12a–12n may be any suitable wireless communication units, including, but not limited to, cellular telephones, internet appliances, PDAs, laptop computers, non-mobile devices, or any other suitable device.

The network control element 16 with dynamic independent communication resource assignment may be incorporated as part of, for example, a base station controller (BSC) that is operatively coupled to a plurality of wireless base transceiver stations (BTS), or may be suitably part of any other network element including the wireless network elements 14a–14n. Each of the wireless network elements 14a–14n are operatively coupled to the network control element 16 to facilitate communication through suitable communication links designated as 20.

Figure 2:
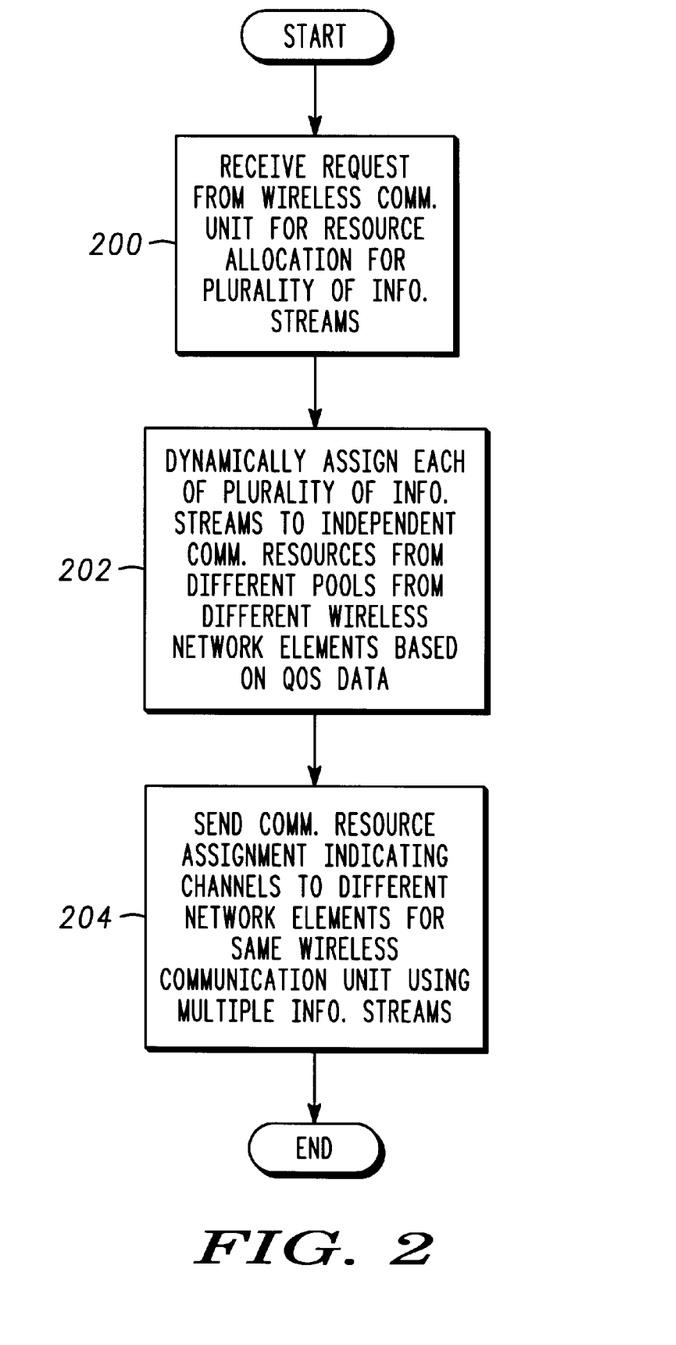
FIG. 2 is a flow chart illustrating one example of a method for wirelessly communicating a plurality of different information streams in accordance with one embodiment of the present invention.

FIG. 2 illustrates a method for wirelessly communicating a plurality of different information streams in accordance with one embodiment of the invention. For purposes of illustration only, each of the different information streams will be assumed to have different quality of service requirements. However, they may have the same quality of service requirements. As shown in block 200, the method includes receiving, such as by the wireless network element 14a, a resource allocation request 22 from the wireless communication unit 12a for a communication resource allocation for each of a plurality of information streams. The wireless network element 14a then forwards the request 22 to the network control element 16 with dynamic independent communication resource assignment. As shown in block 202, the method includes dynamically assigning, such as by the network control element 16, each of the plurality of information streams to independent communication resources from different communication resource pools from different wireless network elements. For example, the network control element 16 may assign one information stream to wireless network element 14b as shown by dashed line 24 and may assign a different information stream from the wireless communication unit 12a to a different wireless network element such as wireless network element 14a as shown by line 26. This dynamic assignment is based on the quality of service data which is obtained by the network control element 16 either through the forwarded request 22 or through another source, if desired, such as another network element. The method includes dynamically assigning each of the plurality of information streams associated with the wireless communication unit 12a to independent communication resources from different communication resource pools from each of the different wireless network elements 14a and 14b. As such, wireless network element 14a may use a code from its CDMA code pool for one information stream such as a voice communication, whereas for the same wireless communication unit 12a, a different wireless network element 14b at a different location is used along with an independent communication resource such as a code from the CDMA pool associated with the wireless network element 14b for a different information stream, such as a high speed data stream.

As shown in block 204, the method includes sending, in response to the resource allocation request 22, a communication resource assignment 28a and 28b to different network elements 14a and 14b for the same wireless communication unit 12a, wherein the wireless communication unit 12a uses multiple information streams. The communication resource assignments 28a and 28b may be suitable messages that define, for example, the codes, rates, channel codings, protocols, mowers, modes etc. that should be used by the different wireless network elements or any other suitable assignment information. Methods of channel assignment for each individual stream are well known in the art. Likewise, certain modes of operation, such as soft handoff, are likewise well known. For example, in the case of soft handoff in CDMA, channel resources from multiple wireless network elements are allocated to support the communication of a single information stream for a subscriber. The wireless network elements 14a and 14b then communicate with the wireless communication unit 12a using independent communication resources of each of the different network elements for the same wireless communication unit 12a.

Where the network control element 16 is operatively coupled to multiple wireless network elements and where multiple wireless communication units are communicating within the system 10, the same operation as described above with respect to other wireless communication unit 12a may occur with respect to wireless communication units 12n.

Figure 3:
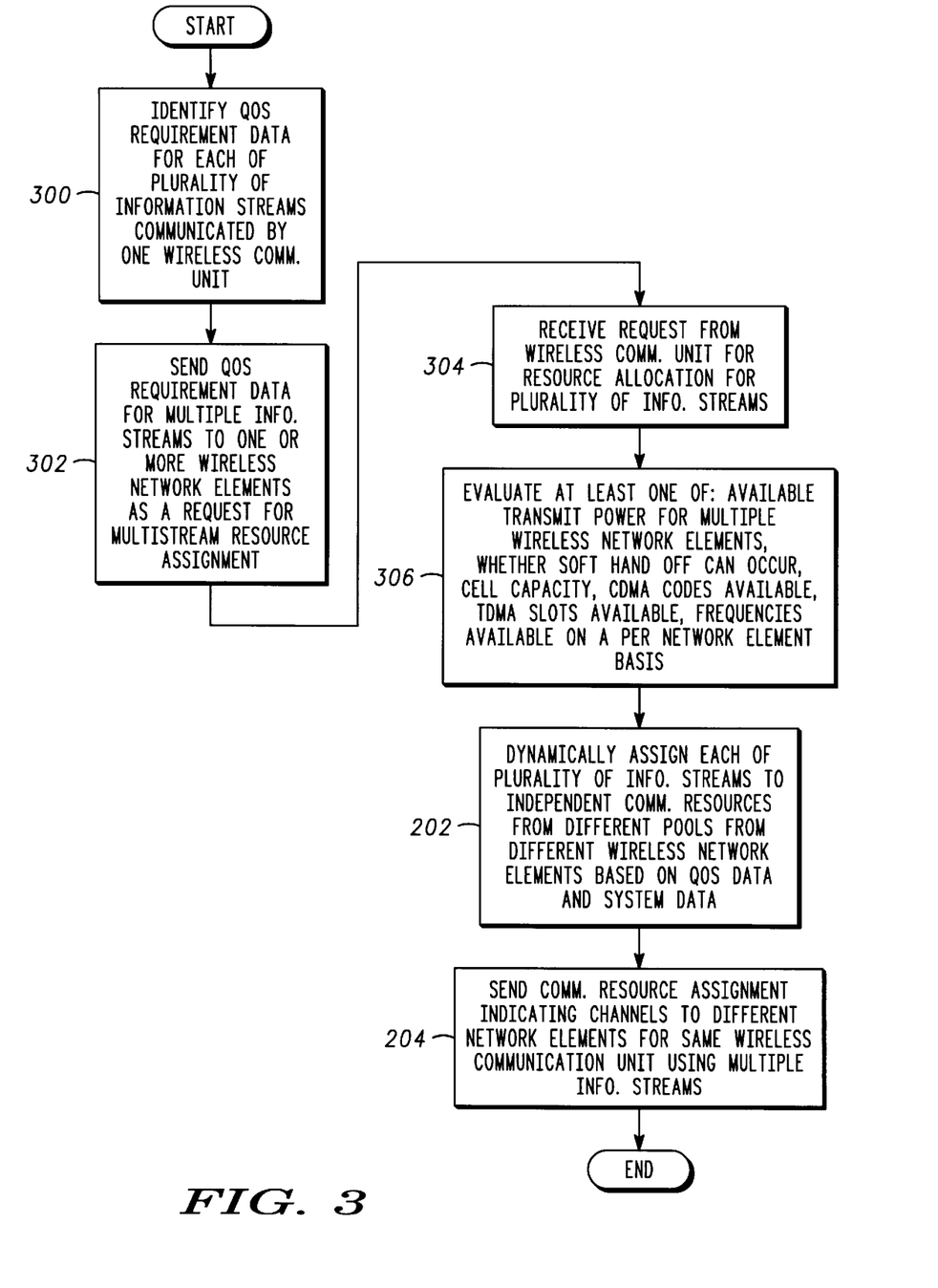
FIG. 3 is a flow chart illustrating an example of a method for wirelessly communicating a plurality of different information streams in accordance with one embodiment of the present invention.

FIG. 3 illustrates in more detail, one example of a method for wirelessly communicating a plurality of different information streams from the same communication unit wherein the different information streams have different quality of service requirements. Quality of service requirement data includes, but is not limited to, data representing an acceptable delay period that the information stream may be amenable to, an acceptable communication bit rate, and an acceptable accuracy level such as a frame erasure rate. For example, some information may need to be low delay, as may be the case for an interactive speech communication. An information stream requiring a higher bit rate may be desirable to use with packet data, wherein acknowledgement and non-acknowledgement protocols may be employed to allow repeats to insure that the data is throughput reliably. The network control element 16 may partition information streams, for example, also where a higher reliability or lower reliability may be suitable. For example, information source coders may provide coded information where the bits have differing importance and may refine the quality output and may optionally omit bits if channel conditions prohibit their communications.

Referring again to FIG. 1, if, for example, the wireless communication unit 12a desires to both engage in a speech conversation as well as do simultaneous internet browsing, the wireless communication unit 12a and its associated plurality of information streams are partitioned using, for example, a continuous low rate speech information path via wireless network element 14a and a high rate intermittent packet communication via wireless network element 14b. As such, the wireless communication unit 12a a establishes two separate links using two completely separate radio resources with different wireless network elements in the same system. The wireless communication unit 12a is initially commanded, such as by the network control element 16 via the wireless network elements 14a–14n, based on the network control element 16 optimally allocating its resources to use from different wireless network elements 14a and 14b.

At some later time, another wireless communication network 12n may be commanded by the network control element 16 to establish an interactive high rate video call with wireless network element 14a or 14c or 14n. The network control element 16 may recognize, for example, that an assignment may exhaust a network element's capacity. The network control element 16 with dynamic impedance communication resource assignment therefore commands the wireless communication unit via a wireless network element 14a–14n to switch to multiple resource utilization over different wireless network elements. Alternatively, one or both mobile subscribers may physically move creating conditions that would cause the wireless network control element to dynamically make resource allocation assignments that are optimally suited to convey all the subscribers' information streams.

FIG. 3 illustrates another example of a method for wirelessly communicating a plurality of different information streams for a single wireless communication unit, wherein the different information streams have different quality of service requirements. As shown in block 300, the method includes identifying, such as by the wireless communication unit 12a, or any other suitable unit, a quality of service requirement and hence quality of service requirement data for each of a plurality of information streams communicated by the wireless communication unit.

As shown in block 302, the method includes sending the quality of service requirement data as part of the resource allocation request 22 for each of the plurality of information streams to at least one wireless network element. As shown in block 304, the method includes receiving, such as by the network control element 16, the resource allocation request 22 for resource allocation for a plurality of information streams for the same wireless communication unit.

As shown in block 306, the method includes evaluating, such as by the network control element 16, or any other suitable element, system-wide wireless link capabilities, in addition to the quality of service requirement data. For example, the network element may evaluate, for example, available transmit power for the various wireless network elements 14a–14n, whether soft hand off can occur for the given wireless communication unit, cell capacity of one or more cells, and the CDMA codes available for assignment. In the case of a TDMA system or FDMA system, or any other system employing time slots or frequencies, the evaluation may also include the availability of TDMA slots and frequencies available on a per network element basis. In addition, if desired, communication link margin may also be evaluated by the network control element 16, such as a wireless network element's location with respect to a wireless network element. In addition, other communication capabilities may also be taken into account, such as power control capabilities of both a wireless network element 14a or any other suitable network element, whether acknowledgement or non-acknowledgement control signaling may occur. The request 22 may be communicated over a suitable control channel if desired, or any other suitable channel as desired. The method then proceeds as indicated by the following blocks 202 and 204 as previously described with respect to FIG. 2.

As shown, for example, in block 204, the method includes sending the communication resource assignment which includes, for example, sending data representing the independent communication resources, to the wireless communication unit. The wireless communication unit can suitably effect communication with a plurality of wireless network elements and their respective different communication resources of each of the different wireless network elements based on the reassignments.

In addition, as noted above with respect to block 306, evaluation of the various wireless network loading factors are taken into account by the network control element 16 including the operation of each of the plurality of network elements 14a–14n and the plurality of wireless communication units 12a–12n to get a more optimal wireless resource assignment.

Where information stream priority is available or where the network control element 16 or wireless communication unit 12a is capable of determining a level of criticality of information streams, the dynamic assignment of the plurality of information streams from the same wireless communication resource may be based on the quality of service data to create differing assignments for non-critical information streams based on minimum acceptable quality of service data for a stream and based on quality of service data requirements for critical information streams. This may be desirable, for example, where an emergency call or other critical information must be communicated and is therefore designated as critical.

It will also be recognized that although described with reference to the network control element 16, the above dynamic assignment of the plurality of information streams may be carried out by the wireless communication units 12a–12n or any other suitable device.

As such, from the perspective of the wireless communication unit, the unit sends the request for a communication resource allocation for each of the plurality of information streams to a network element. The network element determines the suitable resource allocation and sends the allocation back to the wireless communication unit. The wireless communication unit receives, in response to the request, the dynamically assigned independent communication resources for each of the plurality of information streams from different communication resource pool locations from each of the different wireless network elements. The wireless communication unit communicates each of the plurality of information streams to different wireless network elements, using the assigned independent communication resource.

Figure 4:
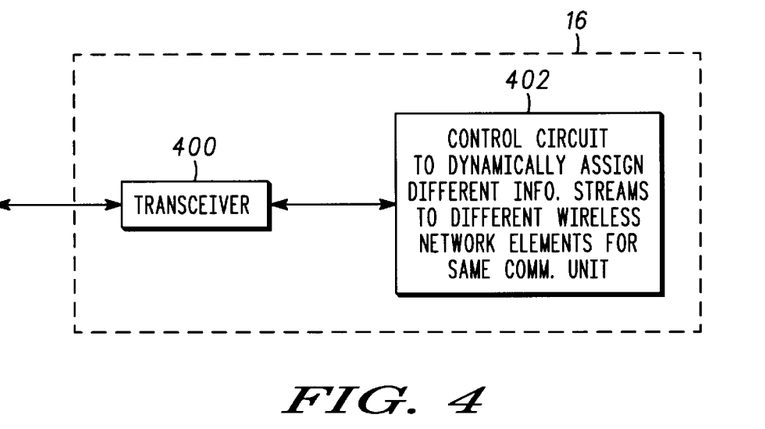
FIG. 4 is a block diagram illustrating one embodiment of a wireless network control element in accordance with one embodiment of the invention.

FIG. 4 is a block diagram illustrating one example of a network control element 16 with dynamic communication resource assignment in accordance with one embodiment of the invention. The wireless network control element 16 includes a transceiver 400 for transmitting and receiving information with the wireless network elements 12a. The wireless network control element 16 also includes a control circuit 402 operatively coupled to the transceiver 400 wherein the control circuit 402 receives the resource allocation request and dynamically assigns each of the plurality of information streams associated with the wireless communication unit, to independent communication resources from different communication resource pools from each of a plurality of different wireless network elements based on quality of service data as described above. Although not shown, other conventional circuitry is employed in the network control element 16 to allow it to operate consistent with the communication system 10. The control circuit 402 may include one or more processing devices, such as but not limited to DSP's, CPU's, microcontrollers, and ASIC's, and associated memory including local or remote memory such as web servers wherein the memory contains executable instructions that when executed by one or more processing devices causes the one or more processing devices to carry out the functionality of the network control element 16 as described above. It will be recognized that the processing device or devices may include, but are not limited to, DSPs, microcontrollers, CPUs, or any other device that processes digital information. The memory (not shown) may include, but is not limited to, optical storage media, magnetic storage media, CD ROMS, DVDs, RAM, ROM, non-local memory, distributed memory, or any other device that stores digital data. Alternatively, the control circuit 402 may be implemented as logic circuitry, software as noted above, firmware, or any suitable combination thereof.

Figure 5:
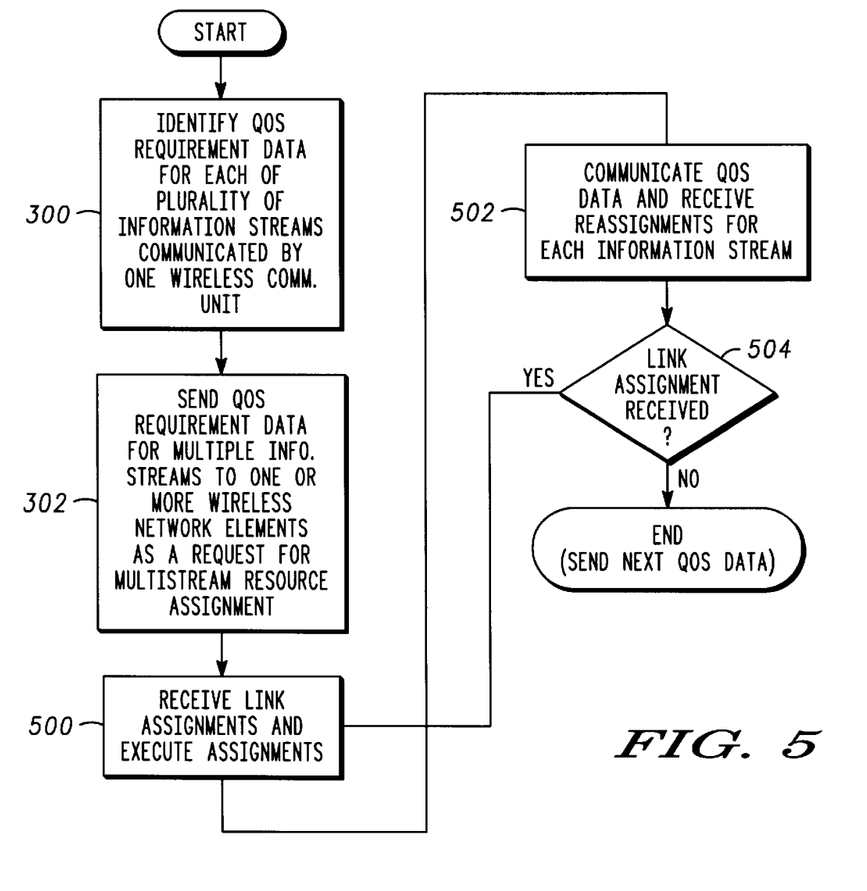
FIG. 5 illustrates an example of a method for wirelessly communicating a plurality of different information streams having different quality of service requirements for a common wireless communication unit with a plurality of different wireless network elements coupled in the same system.

Referring to FIG. 5, as previously described with reference to FIG. 3, after the wireless communication unit identifies quality of service requirements for a plurality of information streams and sends the quality of service requirement data as part of or in addition to the resource allocation request 22 as shown in blocks 300 and 302, the network control element 16 then determines the link assignment for each of the plurality of information streams and sends the communication resource assignment to the wireless communication unit 12*a* indicating the channels (e.g., codes, frequencies, time slots, etc.) associated with different network elements that the wireless communication unit will need to communicate over different wireless network elements. As such, as shown in block 500, the wireless communication unit receives the dynamically assigned link assignments on, for example, a dedicated or associated control channel, and then executes the link assignments. As shown in block 502, if a condition changes with respect to the wireless communication unit, such as if another information stream must be communicated or if a quality of service requirement changes with respect to an information stream already in use, the wireless communication unit 12 communicates the new quality of service requirements and sends them to the network control element 16 whereafter the network control element 16 determines a link reassignment and sends the link reassignment back to the wireless communication unit 12*a* as shown in block 502. The wireless communication unit 12*a* then determines if a link reassignment has been received as shown in block 504. If so, the wireless communication unit then executes the new link assignments for each of the plurality of differing information streams. If no link reassignment has been received, the wireless communication unit will then attempt to recommunicate the quality of service requirement data in an attempt to receive reassignments.

The dynamic assignment or reassignment of wireless resources from different pools from different wireless networks for the same wireless communication unit is preferably (but not required) based on a current system situation so that the network control element 16 determines the optimum allocation for all information streams for all wireless communication units and all wireless network elements within the system or subsystem. Hence the system assigns other wireless network elements to communicate with a plurality of different wireless communication units when another wireless communication unit is added (or dropped) to the system, and as a wireless communication unit moves through the system, for example. The network control element 16, for example, takes into account the population of all wireless communication units 12*a*–12*n* that are communicating using a plurality of information streams at the same time, along with the capabilities of the system and wireless network elements 14*a*–14*n* within the system.

By way of further example, Table 1 below illustrates a pre-reassignment allocation (e.g., an initial resource assignment) for each assignment that takes the system into account as a whole.

TABLE 1

| WIRELESS NETWORK ELEMENT 14a | WIRELESS NETWORK ELEMENT 14b | WIRELESS NETWORK ELEMENT 14n |
|---|---|---|
| A1, a1 | | B1, b1 |

TABLE 2

| WIRELESS NETWORK ELEMENT 14a | WIRELESS NETWORK ELEMENT 14b | WIRELESS NETWORK ELEMENT 14n | WIRELESS NETWORK ELEMENT 14c |
|---|---|---|---|
| A1 | a1 | B1 | b1 |

Referring to FIG. 1, and for purposes of illustration and not limitation, wireless communication unit 12*a* has two information streams A1, a1 (shown as dashed lines 24 and 26) having different quality of service requirements, whereas wireless communication unit 12*n* has different information streams B1, b1 having different quality of service requirements. For initial assignment allocation, the likely assignment of each of the different information streams is based on, for example, the closeness of the wireless communication unit to a given wireless network element. Other criteria, such as the same criteria used to determine whether a hand off may occur may also be used, such as the RSSI, power levels, or any other suitable information. The pre-reassignment allocation is done by determining the resource assignment for critical information streams first. For example, if an information stream is a speech communication versus a data communication, the speech communication is considered more critical. In addition, if there is an emergency conversation or communication this also would be considered a more critical information stream. As such, the method includes creating an assignment for critical links and subsequently creating an assignment of resources for non-critical links at a minimum acceptable quality of service level. As shown (see FIG. 1), the initial pre-reassignment allocations of the different information streams A1 and a1 for wireless communication unit 12*a* are initially assigned to wireless network element 14*a* due to, for example, the closeness of the wireless communication unit to the wireless network element 14*a*. Likewise, the different information streams B1 and b1 are initially assigned to wireless network element 14*n* due to the proximity of the wireless communication unit 12*n* to the wireless network element 14*n*. Preferably, all possible assignments of wireless resources are identified for all different information streams for each wireless communication unit in a table or other suitable form. Once all possible assignments are identified, the network control element 16 computes a goodness metric for all link assignments. The goodness metric may be algorithmically determined from an appropriate weighting of various known or determined criteria such as ability to carry the subscriber's desired traffic and individual user requirements (e.g. an emergency call would receive a high weighting) as well as other performance merit criteria such as overall system traffic throughput (i.e. efficiency), etc. Once the goodness metrics are computed for all possible resource allocations, the method includes determining the highest goodness metric and effecting the resource assignment associated with that metric. FIG. 1 assumes that a suitable goodness metric resulted for the assignments. Subsequently, if a request for resource assignment is received from a wireless communication device, a new pre-assignment allocation is performed to see if any change in link assignment is necessary. If the newly determined goodness metric of a possible link assignment is greater than or equal to a desired threshold, and if a change in quality of service requirement data or priority was received, the method includes revising and sending the new allocation assignments defined by the highest goodness metric for a given link assignment to the affected wireless communication units.

The result is shown in TABLE 2. As shown, different information streams for the same wireless communication unit have been re-assigned to different wireless network elements. It will be noted that if assignment allocations exceed available resources for a given wireless network element, the proposed assignment will be given a low goodness metric to avoid overloading a wireless network element. New assignment allocations may be determined each time a request for resource allocation is submitted by a wireless communication unit, each time a wireless communication unit is handed off, each time a wireless communication unit leaves or enters a coverage area, after a particular time interval, or based on any other suitable criteria.

As shown by TABLES 1 and 2, a reassignment would occur even though an initial information stream assignment that was based on hand off criteria assigned both information streams to one wireless network element 14a, based on quality of service requirement data and limits of the wireless network element 14a. One of the information streams was reassigned to wireless network element 14b since the goodness metric determined for that reassignment was determined to be higher than the goodness metric previously. Hence the network control element dynamically assigns or effectively partitions each information stream optimally to an independent communication resource associated with a different wireless communication unit as needed based on the quality of service requirement data.

As such, among other advantages, the above described methods and apparatus provide two or more separate links using two or more completely independent radio resources from different base stations in the same system. During hand offs, individual information streams may be handed off to different base stations for a single subscriber. Hence one information stream that may require high speed internet packet communication may be assigned to one base station, and another communication resource for another base station may be used for the same subscriber to communicate speech information.

It should be understood that the implementations of other variations and modifications of the invention and its various aspects as may be readily apparent to those of ordinary skill in the art, and that the invention is not limited by the specific embodiments described herein. It is therefore contemplated to cover by the present invention, any and all modifications, variations, or equivalent to fall within the spirit and scope of the basic underlying principles disclosed and claimed herein.

What is claimed is:

1. A method for wirelessly communicating a plurality of different information streams having different quality of service requirements over different communication resources between a wireless communication unit and a plurality of wireless network elements each having a limited pool of communication resources for allocation comprising:

receiving a request from the wireless communication unit for a communication resource allocation for each of the plurality of information streams; and dynamically assigning each of the plurality of information streams associated with the wireless communication unit to independent communication resources from different communication resource pool locations from each of the different wireless network elements.

2. The method of claim 1 including the steps of:

identifying, by the wireless communication unit, quality of service requirement data for each of the plurality of information streams; and sending the quality of service requirement data for each of the plurality of information streams to at least one of the wireless network elements; and wherein dynamically assigning each of the plurality of information streams to independent communication resources from each of the different wireless network elements, is based on the sent quality of service requirement data.

3. The method of claim 1 including the step of sending data representing the independent communication resources to the wireless communication unit.

4. The method of claim 2 wherein the quality of service requirement data is based on at least one of: an acceptable delay period, an acceptable communication bit rate, an acceptable accuracy level and an information priority level.

5. The method of claim 1 wherein the step of dynamically assigning each of the plurality of information streams associated with the wireless communication unit to independent communication resources from different communication resource pool locations from each of the different wireless network elements includes evaluating at least a plurality of: available transmit power for one or more wireless network elements, a cell capacity of one or more cells, whether soft hand-off can occur with the wireless communication unit and the plurality of wireless network elements; a number of CDMA codes available for a wireless network element, a number of FDMA frequencies available, a number of TDMA time slots available a communication link margin, whether an acknowledgment/non-acknowledgement signal can be used and a power control capability of at least one of the wireless communication unit and one of the wireless network elements.

6. The method of claim 2 wherein dynamically assigning each of the plurality of information streams to independent communication resources from each of the different wireless network elements is based on an evaluation of a communication network loading including operation of each of the plurality of wireless network elements and a plurality of wireless communication units communicating with the plurality of wireless network elements.

7. The method of claim 6 dynamically assigning each of the plurality of information streams to independent communication resources from each of the different wireless network elements includes creating an assignment for critical information streams based on quality of service data and creating different assignments for non-critical information streams based on minimum acceptable quality of service data.

8. A method for wirelessly communicating a plurality of different information streams having different quality of service requirements over different communication resources between a wireless communication unit and a plurality of wireless network elements each having a limited pool of communication resources for allocation comprising:

receiving a request from the wireless communication unit for a CDMA communication resource allocation for each of the plurality of information streams;

dynamically assigning each of the plurality of information streams associated with the wireless communication unit to independent CDMA codes from different communication resource pools from each of the different wireless network elements based on quality of service data provided by the wireless communication unit; and sending data representing the independent CDMA codes to the wireless communication unit for each of the information streams.

9. The method of claim 8 including the step of receiving, by each of the plurality of wireless network elements, a different information stream coded using different CDMA codes from each of respective different communication resource pools, in response to sending data representing the independent CDMA codes to the wireless communication unit for each of the information streams.

10. A wireless network control element for controlling a plurality of different wireless network elements comprising:
   a transceiver operatively coupled to receive a request from a wireless communication unit for a communication resource allocation for each of a plurality of information streams; and
   a control circuit operatively coupled to the transceiver; the control circuit operative to dynamically assign each of the plurality of information streams associated with the wireless communication unit to independent communication resources from different communication resource pools from each of a plurality of different wireless network elements based on quality of service requirement data.

11. The wireless network control element of claim 10 wherein the control circuit is operative to evaluate at least a plurality of: an available transmit power for one or more wireless network elements, a cell capacity of one or more cells; whether soft hand-off can occur with the wireless communication unit and the plurality of wireless network elements; a number of CDMA codes available for a wireless network element, a number of FDMA frequencies available; a number of TDMA time slots available a communication link margin, whether an acknowledgment/nonacknowledgement signal can be used and a power control capability of at least one of the wireless communication unit and one of the wireless network elements.

12. The wireless network control element of claim 10 wherein the control circuit determines communication resource assignment based on an evaluation of a communication network loading including operation of each of the plurality of wireless network elements and a plurality of wireless communication units communicating with the plurality of wireless network elements.

13. The wireless network control element of claim 10 wherein the control circuit determines communication resource assignment by creating an assignment for critical information streams based on quality of service data and creating different assignments for non-critical information streams based on minimum acceptable quality of service data.

14. The wireless network control element of claim 10 wherein the control circuit is comprised of memory and one or more processing devices that executes executable instructions stored in the memory and wherein the executable instructions cause the one or more processing devices to: dynamically assign each of the plurality of information streams associated with the wireless communication unit to independent communication resources from different communication resource pools from each of a plurality of different wireless network elements based on quality of service data.

15. A wireless communication system comprising:
   a wireless communication unit that wirelessly communicates a plurality of different information streams having different quality of service requirements over different communication resources;
   a plurality of different wireless network elements in operative communication with the wireless communication unit, each having a limited pool of communication resources for allocation;
   a wireless network control element, operatively coupled to the plurality of different wireless network elements, that includes:
      a transceiver operatively coupled to receive a request from a wireless communication unit for a communication resource allocation for each of a plurality of information streams; and
      a control circuit operatively coupled to the transceiver; the control circuit operative to dynamically assign each of the plurality of information streams associated with the wireless communication unit to independent communication resources from different communication resource pools from each of a plurality of different wireless network elements based on quality of service requirement data.

16. The system of claim 15 wherein the control circuit is operative to evaluate at least a plurality of: available transmit power for one or more wireless network elements, a cell capacity of one or more cells, whether soft hand-off can occur with the wireless communication unit and the plurality of wireless network elements; a number of CDMA codes available for a wireless network element, a number of FDMA frequencies available, a number of TDMA time slots available a communication link margin, whether an acknowledgment/nonacknowledgement signal can be used and a power control capability of at least one of the wireless communication unit and one of the wireless network elements.

17. The system of claim 15 wherein the control circuit determines communication resource assignment by creating an assignment for critical information streams based on quality of service data and creating different assignments for non-critical information streams based on minimum acceptable quality of service data.

18. The system of claim 15 wherein the wireless communication unit is operative to:
   identify quality of service requirement data for each of the plurality of information streams; and
   send the quality of service requirement data for each of the plurality of information streams to at least one of the wireless network elements.

19. The system of claim 18 wherein the quality of service requirement data is based on at least one of: an acceptable delay period, an acceptable communication bit rate, an acceptable accuracy level and an information priority level.

20. A method for wirelessly communicating a plurality of different information streams having different quality of service requirements over different communication resources between a wireless communication unit and a plurality of wireless network elements each having a limited pool of communication resources for allocation comprising:
   sending a request, by the wireless communication unit, for a communication resource allocation for each of the plurality of information streams; and
   receiving, in response to the request, dynamically assigned independent communication resources for each of the plurality of information streams from different communication resource pool locations from each of the different wireless network elements.

21. The method of claim 20 including communicating, by the wireless communication unit, each of the plurality of information streams to different wireless network elements, using the assigned independent communication resource.

* * * * *